C. B. BARTLEY.
STORAGE BATTERY LAMP.
APPLICATION FILED MAR. 19, 1912.
1,056,393.
Patented Mar. 18, 1913.
3 SHEETS—SHEET 1.
FIG. 1.
FIG. 2.
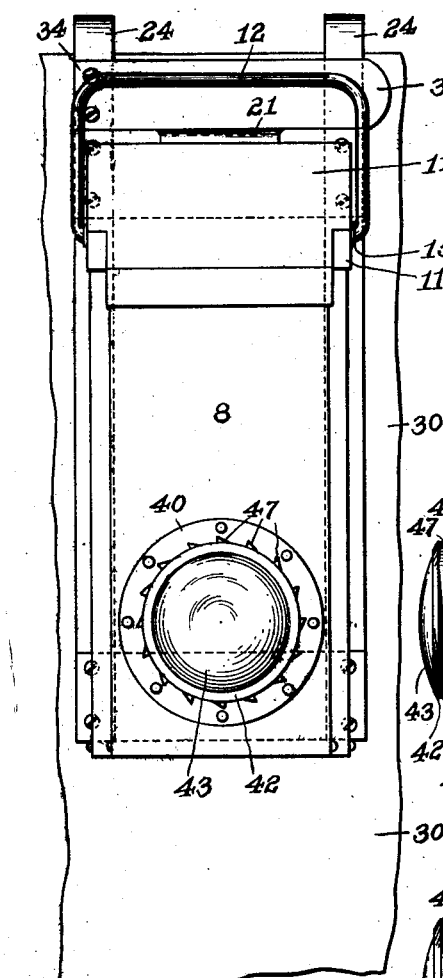
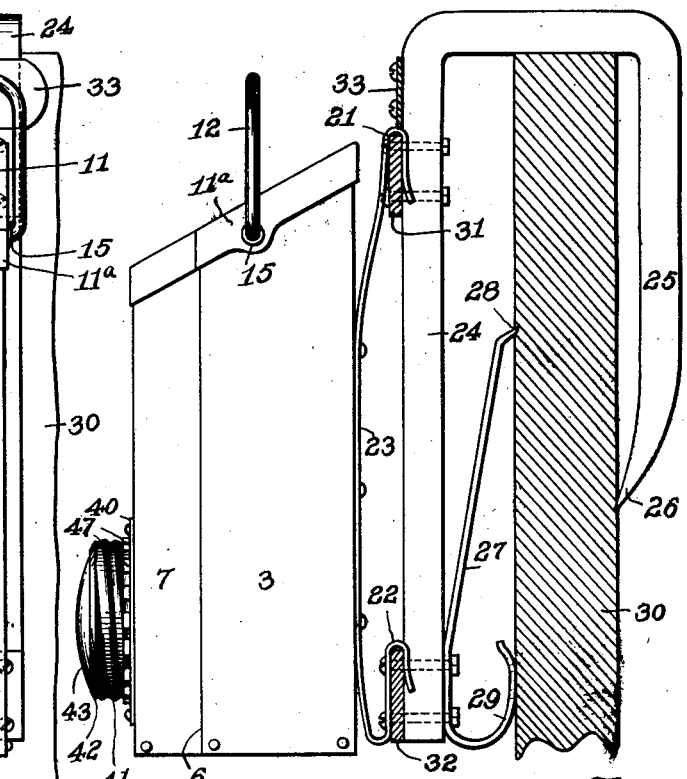
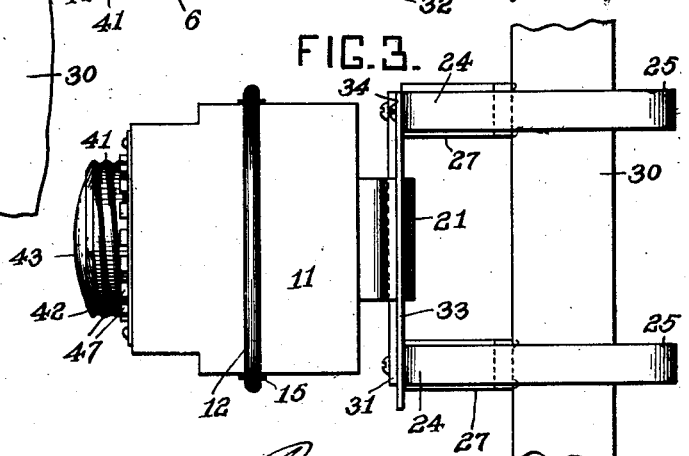
FIG. 3.
WITNESSES:
INVENTOR
Charles B. Bartley
by C. M. Clarke
Atty

C. B. BARTLEY.
STORAGE BATTERY LAMP.
APPLICATION FILED MAR. 19, 1912.

1,056,393.

Patented Mar. 18, 1913.

3 SHEETS—SHEET 2.

WITNESSES:

INVENTOR
Charles B. Bartley
by O. M. Clarke
Atty

C. B. BARTLEY.
STORAGE BATTERY LAMP.
APPLICATION FILED MAR. 19, 1912.
1,056,393.
Patented Mar. 18, 1913.
3 SHEETS—SHEET 3.
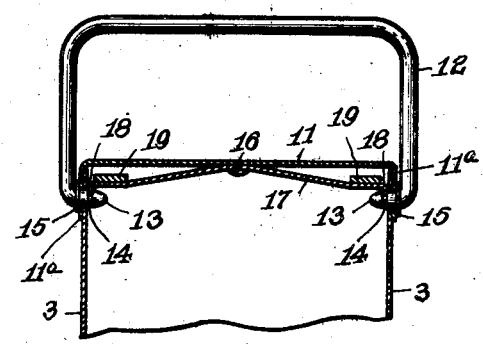
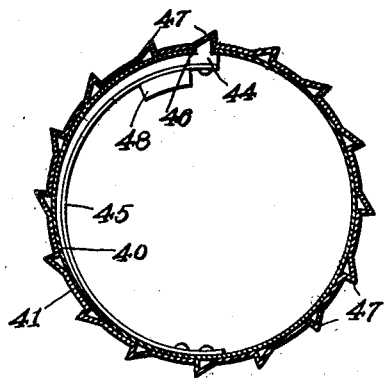
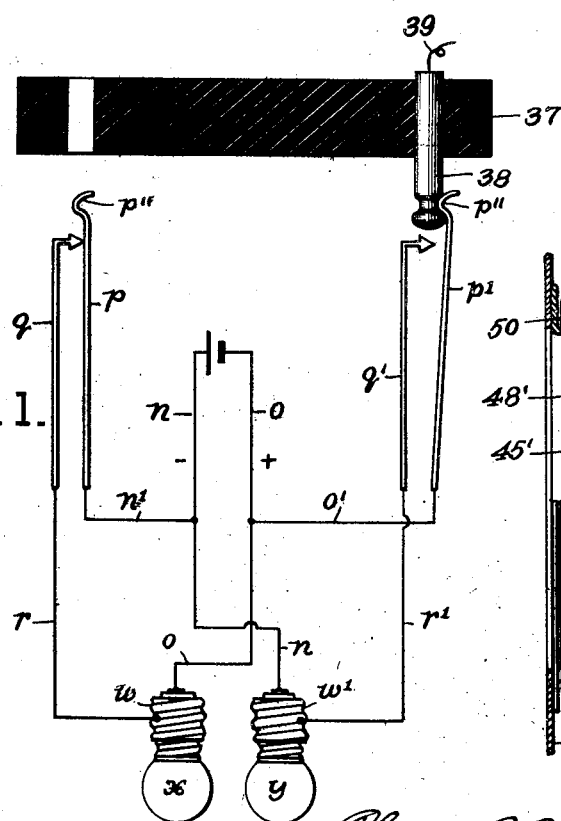
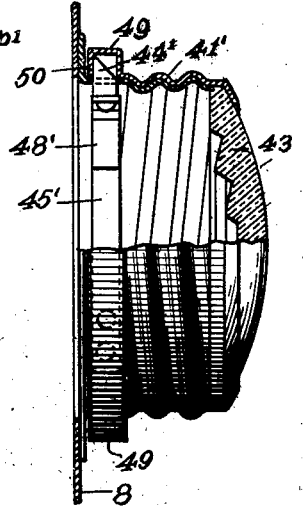
WITNESSES:
Charles B. Bartley INVENTOR

UNITED STATES PATENT OFFICE.

CHARLES B. BARTLEY, OF PITTSBURGH, PENNSYLVANIA, ASSIGNOR, BY DIRECT AND MESNE ASSIGNMENTS, TO GEORGE F. RYLANDS, OF CHARLEROI, PENNSYLVANIA.

STORAGE-BATTERY LAMP.

1,056,393.  Specification of Letters Patent.  Patented Mar. 18, 1913.

Application filed March 19, 1912. Serial No. 684,870.

*To all whom it may concern:*

Be it known that I, CHARLES B. BARTLEY, a citizen of the United States, residing at Pittsburgh, in the county of Allegheny and State of Pennsylvania, have invented certain new and useful Improvements in Storage-Battery Lamps, of which the following is a specification.

My invention relates to improvements in storage battery lamps for miners and others and particularly refers to a lamp adapted to be carried in the hand, or on the body or mounted on a mine car as a "tail lamp" or for use wherever there is considerable vibration or jolting, as in motor or other vehicles.

The lamp is especially designed to provide a case of especial construction having an inclosed storage battery with a surrounding cushioning substance, a lamp compartment, a resilient lamp mounting and connections with the battery, switch mechanism for utilizing one of a plurality of lamps, a lens, a magnetically operable lens cover and case cover, and other features of improvement as shall be more fully hereinafter described.

The application also discloses a carrying bracket for the lamp for attachment to a mine car or the like.

Figure 4:
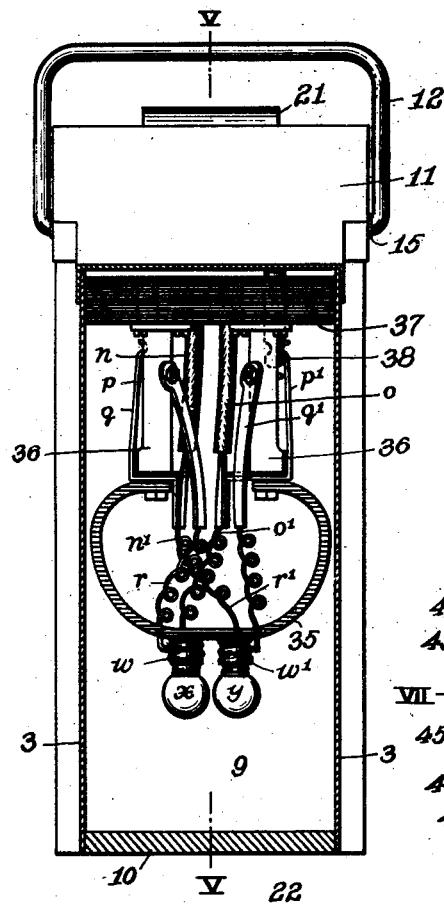
Figure 5:
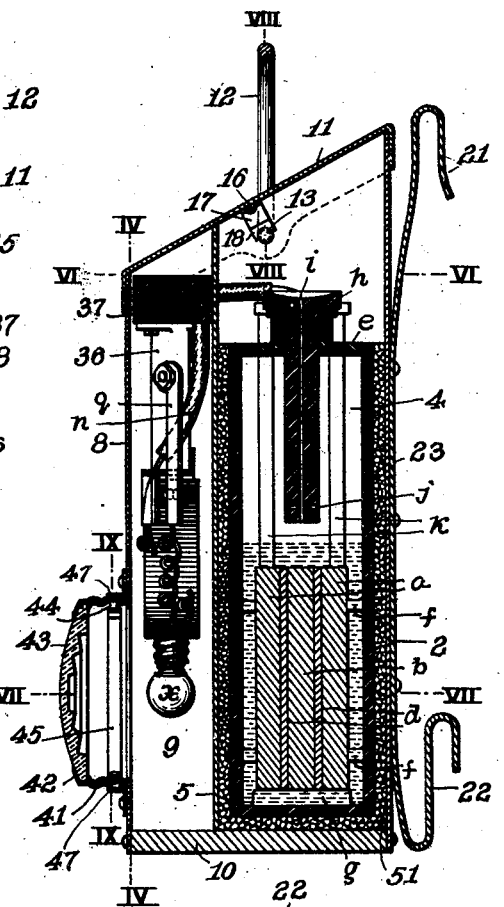
Figure 6:
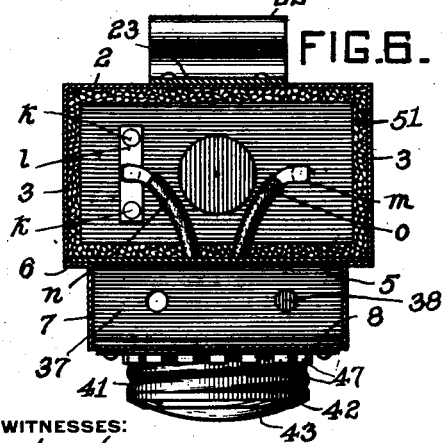
Figure 7:
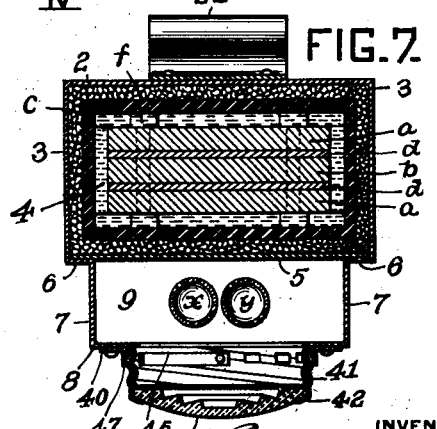

In the drawings—Figure 1 is a view of the lamp in front elevation. Fig. 2 is a side view, showing the carrying bracket. Fig. 3 is a plan view. Fig. 4 is a vertical sectional view through the lamp case, indicated by the line IV. IV. of Fig. 5. Fig. 5 is a central vertical sectional view through the entire apparatus, taken on the line V. V. of Fig 4. Figs. 6 and 7 are horizontal sectional views taken on the lines VI. VI. and VII. VII. of Fig. 5. Fig. 8 is a detail sectional view taken on the line VIII. VIII. of Fig. 5, illustrating the magnetically controlled locking device for the cover. Fig. 9 is an enlarged sectional detail view through the lens casing, indicated by the line IX. IX. of Fig. 5, illustrating the magnetically controlled locking device. Fig. 10 is a detail view similar to the construction of the lens mounting illustrated in Figs. 5 and 7, but showing a modified arrangement of the magnetically controlled locking device. Fig. 11 is a detail diagrammatic view illustrating the wiring circuits of the lamp.

The casing of the battery is made of sheet metal, in box form, generally rectangular in cross section, providing the rear wall 2 and sides 3, 3, inclosing the battery chamber 4. A partition 5 extends laterally across the front of said chamber, engaging off-set portions 6, 6, in the side walls, which extend forwardly thereof, as at 7, 7, and are joined by the front plate 8, thus providing and inclosing the lamp chamber 9.

The entire case is provided with a bottom 10 of any suitable material and a removable cover 11. Said cover is preferably disposed at an angle or slope across the top of the case, from the back portion downwardly toward the front, whereby to easily deflect any falling substance as coal or the like from the case. The cover 11 is designed to be removably secured upon the top of the case for access to the interior, and to be locked thereon against unauthorized removal. For such purpose I provide a carrying bail or handle 12 of wire having inwardly deflecting terminals 13, each provided with a surrounding annular groove 14 and an outer limiting abutment or shoulder 15. To the inner side of the cover is secured centrally as by a rivet 16, the spring arm 17 extending in each direction toward the inner side of the cover and provided with downwardly turned terminal lips 18 adapted to engage the annular grooves 14 of the bail terminals. The arms 17 are resilient for downward engaging pressure with the grooves, and each is provided across its upper end portion with a bar or block 19 of magnetic metal.

The terminals 13 extend inwardly through registering openings in side flanges 11ª of the top 11 and also in the upper central portion of the sides 3, positively securing them together, and the inner terminals 13 being tapered or rounded, easily slip inwardly past the terminals 18 of the spring arms 17 and become locked thereby. They are released by the use of a special magnet in the possession of the foreman or mine boss only, and the device is thus proof against being opened by any one else.

The back 2 of the case is provided with supporting securing hooks 21, 22, respectively formed on the ends of a strap 23 which is riveted or otherwise secured to the back of the case and which has between the hooks and the securing attachment a considerable length and latitude of movement providing for oscillation or swinging of the case forwardly or backwardly in the event of jars or vibrations. The lamp and battery and the inclosing case provided with these attaching hooks are shown in Figs. 1, 2 and 3 as mounted upon my improved bracket which is especially designed for mounting upon the rear wall of the mine car or the like. The bracket consists of a pair of hooked bars 24 having downwardly turned back portions 25 terminating in inwardly directed pointed extremities 26.

Extending inwardly and upwardly from the lower ends of the bars 24 are spring arms 27 having similar biting terminals 28, the other ends of the arms 27 being turned up in rounded form, as at 29, adapted to bear with cushioning resistance against the face of the end wall 30 of the mine car. Across the upper and lower portions of bars 24 and rigidly connecting and holding them in position, are supporting bars 31, 32, respectively, adapted to receive the supporting hooks 21 and 22. For the purpose of retaining the device as thus mounted positively in position against dislodgment, I provide a spring tongue 33 secured at one end to one of the bars 24, as at 34, the other end being free. By this means the tongue 33 can be drawn outwardly at one end and the hook 21 inserted behind it above bar 31, hook 22 at the same time being placed for engagement with bar 32, whereupon the lamp casing may be lowered to the position illustrated in Figs. 1 and 2, and spring tongue 33 will positively hold the upper hook 21 against dislodgment or accidental removal. As thus mounted the entire casing is fixedly maintained in suitable operative relation to the end of the mine car and is capable of very considerable resilient movement toward and from it, due to the elongated spring-like terminals of hooks 21 and 22.

Within the cavity 4 of the casing is the battery. In the construction shown it comprises two outermost negative plates $a$ and an intervening positive plate $b$, mounted within the outer surrounding insulating casing $c$, and separated by separators or spacers $d$ of chemically treated wood or other suitable material forming an electric gap. Each plate is generally rectangular in form, of lead or lead alloy of any desired construction as that shown in my prior application, Serial No. 651,424.

The plates are inserted as stated within the case $c$ of hard rubber having a sealing top $e$ and inwardly and upwardly projecting interior abutments $f$ and $g$, suitably arranged across the inner faces of the walls and bottom of the case to fixedly hold the plates in assembled position, with ample surrounding clearance space for the electrolytic fluid. Screwed into the upper portion of the cover $e$ is a cap $h$ having an enlarged head and a central perforating aperture $i$ extending longitudinally throughout its length. The filler cap is somewhat concaved at its outer head portion and extends downwardly into the interior of the case to a point slightly above the normal level of the electrolyte, as clearly shown in Fig. 5. It is provided with a transverse port $j$ extending from one side to the other and communicating with the central port $i$. The object of this construction is to provide for ventilation of gases from within the battery cavity through the lateral port $j$ at either side and the central port $i$ to the exterior, in whatever position the battery may assume. The extension of the plug $h$ downwardly into the electrolyte cavity also prevents any leakage, irrespective of whatever angle or position the battery may have.

Conductors $k$, $k$, extend upwardly from the negative plates $a$, $a$, through the cover $e$ of the case and are joined by a co-acting cross bar $l$, while a similar conductor $m$ extends upwardly from the positive plate $b$ through the cover plate $e$ outside of the case. To the bar $l$ is fused or otherwise connected the conductor $n$, while to the bar $m$ is similarly connected the conductor $o$, forming the main conductors for the lamp circuit.

In using the lamp one or two individual lamps may be employed, preferably two, for the purpose of providing an emergency lamp in case of deficiency or defect in the other.

The lamps $x$ and $y$ are of a well known type having screwed contact bases $w$, which for the purpose of providing resilient mounting are carried by a band of rubber 35 within the lamp compartment 9 and depending from the lower portion of a supporting frame 36 of any suitable construction, mounted within the upper portion of said compartment. The frame 36 may be of a suitable design to provide for the mounting of the make-and-break contact mechanism, hereinafter described, and depends downwardly from a cross bar 37 secured in the upper portion of the lamp compartment 9, as clearly shown in Figs. 4 and 5. The leads $n$ and $o$ from the poles of the battery, which are preferably covered with insulation as shown, are connected directly with one contact terminal of the lamps $w'$ and $w$ respectively, connecting adjustable contact elements $p$ and $p'$ respectively, as clearly shown in the diagram of Fig. 11.

The co-acting contact elements $q$ and $q'$ are connected by conductors $r$ and $r'$ respectively with the other terminals of the lamps $x$ and $y$ respectively, and close the circuits therethrough.

Each pair of contact terminals $p$, $q$, and $p'$, $q'$, respectively are normally in contact and are adapted to be separated by the insertion through the bar 37 of a pin 38 having a terminal adapted to ride over the curved terminal p″ of contact element p or p′, to throw it away from engagement with the terminal contact q or q′. By this arrangement either of the lamps may be thrown out of circuit during the operation of the other lamp and by changing the pin, the other lamp can be thrown out and the contact closed to the one previously out of the circuit, so as to quickly substitute one lamp for another for any reason desired.

The plug 38 is provided with a terminal conductor 39 by which, when two such plugs are inserted, one at each side and connected with a generator, the battery may be charged.

The plug, being within the covering top 11, is inaccessible except when the top is removed. The resilient mounting of the lamps by the stiff rubber bands 39 permits of ample range of movement within the case 9, due to vibration or jolts without impairment of the efficiency of the equipment.

The lower rounded portion of the front wall 8 of the lamp chamber 9 is provided with a circular ring or shell 40 upon which is screwed a lens holding ring 41 having an inwardly extending flange 42 and in engagement with the periphery of the lens 43, holding it tightly in place against the end of ring 40, when screwed up tight. The lens 43, being directly in front of lamps x and y is operative to transmit their rays forwardly of the lamp case.

For the purpose of preventing unauthorized opening of the lens holder, I have provided it with a magnetically operative locking device, consisting of a locking dog or ratchet tooth 44 mounted on the end of a rounded spring 45 secured within the shell and extending outwardly through a registering opening 46 therein and adapted to engage one of an annular series of ratchet abutments 47. These abutments are arranged at closely adjacent intervals around the inner periphery of the screw cap 41, so that as it is screwed up, it will become locked at the position when it it tight, which position may vary with the thickness of the lens. Spring 45 is provided with an armature 48 whereby upon application of a suitable magnet, exterior of the case, the dog 44 may be withdrawn and the shell unscrewed.

In Fig. 10, I have shown a modified construction in which the lens holding cap 41′ is provided at its inner portion with an enlarged annular open ring 49 having an inwardly extending flange 50. Spring 45′ is provided with a dog 44′ having an inclined outer face, over which the flange 50 will ride to depress the dog upon the application of the screw ring, the dog springing up inside of flange 50 when it is screwed up tight. Spring 45′ is also provided with an armature block 48′ rendering it subject to magnetic attraction for unlocking in the same manner as above described. By this means the lamps are rendered inaccessible without use of the magnet in possession of the mine boss or foreman.

The battery and its case, within the battery chamber 4, are preferably surrounded with a packing of any suitable material 51, as granulated cork or the like, loosely placed, so as to permit of slight movement of the battery and ample cushioning against the usual shocks or jars of use.

The lamp, as a whole, thus provides against derangement due to shocks or jars to which it is ordinarily subjected in the somewhat rough and careless handling which such lamps usually receive. The entire construction is very strong and serviceable, small and compact and not liable to get out of order. It is readily taken apart for inspection or repair and will be found to be very useful for the objects intended.

Having described my invention, what I claim is:

1. In a storage battery lamp, the combination of a casing having a battery compartment and a lamp compartment and a separating partition, a battery, a lamp in circuit therewith, an insulating bar provided with a plug opening, and a switch device entirely within the interior of the casing and covered by said bar, substantially as set forth.

2. In a storage battery lamp, the combination of a casing having a battery compartment and a lamp compartment and a separating partition, a battery, a lamp in circuit therewith, spring contact mechanism controlling the circuit through the lamp, an insulating bar closing the lamp compartment having a plug opening, and a separating plug therefor, substantially as set forth.

3. In a storage battery lamp, the combination of a casing having a battery compartment and a lamp compartment and a separating partition, a battery, a plurality of lamps in circuit therewith each having spring contact mechanism controlling the circuit, and a separating plug and sockets therefor operable to break the circuit through either lamp, substantially as set forth.

4. Means for resiliently mounting a lamp consisting of a supporting frame and a depending loop of resilient material having a lamp socket, and means for establishing circuit thereto, substantially as set forth.

5. Means for resiliently mounting a lamp consisting of a supporting frame, contact mechanism depending therefrom, a loop of resilient material depending from the frame and having a lamp socket, and circuit connections thereto from the contact mechanism, substantially as set forth.

6. Means for resiliently mounting a lamp consisting of a supporting frame, contact mechanism depending therefrom embodying normally closed terminals, a loop of resilient material depending from the frame and having a lamp socket, a conductor connecting one of the terminals with the lamp socket, a battery connection for the other terminal, and a plug adapted to separate said terminals, substantially as set forth.

7. The combination with a storage battery lamp case inclosing contact mechanism and a circuit breaker, of a removable cover provided with a bail securing the cover to the case and a magnetically controlled locking mechanism engaging the inner ends of the bail, substantially as set forth.

8. The combination with a storage battery lamp case and a carrying bail having interlocking terminals, of a cover for the case provided with resilient locking arms having magnet controlled portions adapted to engage the bail terminals, substantially as set forth.

9. The combination with a storage battery lamp case, of a cover therefor provided with resilient locking arms having magnet controlled portions, and a holding bail provided with terminals adapted to interlock therewith, substantially as set forth.

10. The combination with a storage battery lamp case of a lens holder provided with a semi-circular resilient magnet controlled locking device, substantially as set forth.

11. The combination with a storage battery lamp case of a lens holding base, a lens holding frame screwed thereon, and a semi-circular resilient magnet controlled locking device engaging the base and frame respectively, substantially as set forth.

12. A storage battery and case comprising a sheet metal casing having a battery compartment, a lamp compartment, and a lens, a battery within the battery compartment, means for resiliently packing it therein, a resiliently mounted lamp in the lamp compartment, conductors connecting the lamp and battery, and a circuit breaker therefor, substantially as set forth.

13. A storage battery and case comprising a sheet metal casing having a battery compartment, a lamp compartment, and a lens, a battery within the battery compartment, means for resiliently packing it therein, a resiliently mounted lamp in the lamp compartment, conductors connecting the lamp and battery, a circuit breaker therefor, and a cover for the case having a magnetically controlled lock, substantially as set forth.

In testimony whereof I hereunto affix my signature in the presence of two witnesses.

CHARLES B. BARTLEY.

Witnesses:
  C. M. CLARKE,
  FREDK. STAUB.